Figures 1, 2:
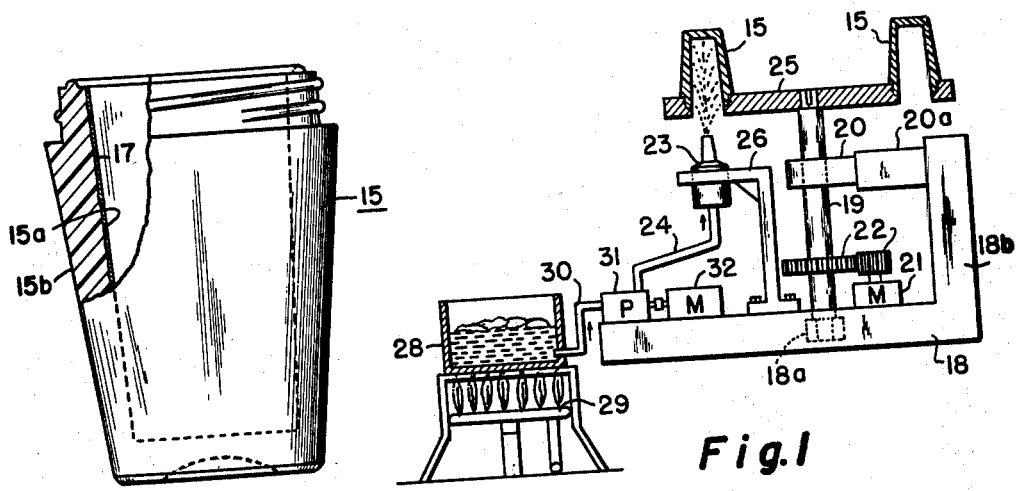

June 15, 1965   J. B. ORR   3,189,242
COATED EXPANDED RESIN CONTAINER
Filed May 23, 1961

INVENTOR.
John B. Orr
BY Green, McCallister & Miller
HIS ATTORNEYS

United States Patent Office 3,189,242
Patented June 15, 1965

3,189,242
COATED EXPANDED RESIN CONTAINER
John B. Orr, Great Barrington, Mass., assignor to Sheffield Plastics, Inc., Sheffield, Mass., a corporation of Massachusetts
Filed May 23, 1961, Ser. No. 112,014
10 Claims. (Cl. 229—3.1)

This application is a continuation-in-part of application Serial No. 812,776, filed May 12, 1959.

This invention relates to expanded resin containers, particularly in the nature of expanded polystyrene containers, and to providing a moisture barrier by the application of a surface coating thereto.

Expanded polystyrene resins or plastics may be molded or formed into useful articles, such as open mouth containers, jars, etc., by employing expandable or pre-expanded resin beads. This may be accomplished by applying steam at a suitable pressure, for example, in the neighborhood of 30 pounds per square inch to a mass of beads while positioning them in the mold. In this manner, they are heated and expanded to form an adherent body having a cavity-defining wall, usually with an open mouth or neck portion having a latching means for a lid, such as screw threads. A body of this type is relatively inexpensive, lightweight and is somewhat soft, spongy and resilient. The surfaces of the material body that abut the mold parts during the expansion-forming operation may be given a somewhat glazed appearance (smooth and glossy) by controlling the temperature immediately adjacent such surfaces. A container produced in this manner, of polystyrene, may have a density of about ½ to 20 pounds per cubic foot, as compared to a density of about 60 pounds per cubic foot for presure-molded polystyrene. I have found that an expanded material, when formed into a container, should have a density of about 5 pounds per cubic foot and will normally have about 1/15 of the weight of a conventional pressure-molded product.

A container of this type, whether its surface has been glazed or not, is highly (somewhat microscopically) porous from the standpoint of moisture vapor transmission. This tends to make it unsuitable as a container for cosmetic and drug products that are particularly susceptible to deterioration due to moisture loss. Certain producers of hand creams and shampoos specify that moisture vapor loss shall not exceed 3% per year, when stored at 100° F. or, in a four-ounce jar, of greater than 3.5 grams per year.

This has presented a problem in making expanded polystyrene containers practical for widened utilization and particularly in the field of drug products.

It has thus been an object of my invention to devise a solution to the problem which will make possible the utilization of a relatively inexpensive expanded resin container, but will at the same time, provide the container with a suitable or a much improved moisture transmission resistance;

Another object has been to develop a sealing coating which will meet the problem and which will be relatively inert, both in its application and its utilization from the standpoint of the resin material of the container body;

A further object has been to devise a method of sealing and maintaining closed the small interstices or moisture transmission passages in a container having a body of expanded resin material in the nature of polystyrene;

A still further object of my invention has been to determine the factors involved in providing a practical form of coating application and for meeting such factors in producing a new and improved type of coated product that will meet requirements and extend the field of application of containers of this type;

These and other objects of my invention will appear to those skilled in the art from the description of my invention and the appended claims.

FIGURE 1 is a diagrammatic view in elevation illustrating how a sealing coating (moisture barrier) may be applied in accordance with my invention to inner wall surfaces of containers;

And, FIGURE 2 is an enlarged vertical view in elevation showing a complete jar or container having an inner wall coating provided in accordance with my invention.

In endeavoring to develop a moisture barrier or coating which will meet the requirements in this connection, I found that a coating material is needed that will be inert or non-reactive with respect to the surface of the resin to which it is applied, will strongly adhere to such surface, and will be relatively inert or inactive with respect to creams and other materials which are to be placed and stored within the container. A highly important factor is the ability of such coating to provide an efficient and effective moisture barrier throughout the utilization of the container. In addition, the coating should, in its solidified state, provide a good resistance to wear and tear from the standpoint of the use of the container and the insertion as well as the removal of its contents.

Containers of this type may be expansion-formed by a steam application within a temperature range of about 230° to 275° F., and must be cooled to prevent further expansion. The resin beads themselves may be formed within a temperature range of about 190° to 240° F., and curing requires a temperature in the neighborhood of about 160° to 200° F. Although expanded polystyrene has a softening temperature in the neighborhood of about 220° F., it has been determined that there is a wide range of temperature to which the formed product is more or less sensitive.

In testing expanded polystyrene molded jars or containers for moisture loss, I found that the average loss for a group of ten, four-ounce uncoated jars was about 3.5 grams per week or fifty-two times that specified by cosmetic producers.

In endeavoring to find a suitable, relatively inert coating, I experimented with paraffin wax and tried coating the inside of the above-mentioned four-ounce jars with a microcrystalline wax consisting of paraffin wax containing small amounts of powdered polyethylene (to reduce the size of the paraffin crystals). This was done by filling them with melted wax having a temperature of about 180° F. and then dumping the excess wax while still molten. Upon cooling and solidification of the wax coating, the samples were tested for moisture vapor loss and showed an average loss of about 2.33 grams in four weeks, or about .58 gram per week. The range of losses was about 1 gram per week for the worst container and the best one lost about .14 gram per week; the average thickness of the coatings was .006 inch. This relatively high moisture loss indicated that the coating was unsatisfactory for some reason. On further study and investigation, I found that the hot wax had caused the expanded polystyrene beads of the jars to react or expand further, particularly along the surface area to which the coating was being applied, thus giving off gas which created pin or fine holes in the solidified coating.

I then tried filling the jars with a wax at a lower temperature than 180° F. and, although this reduced the moisture loss to some extent, I found that it did not solve the pinhole problem, since the melting point of the wax was about 140° F. and, as you approach this temperature, the layer of wax coating increases to a point where its thickness becomes objectionable and the coating becomes grainy or lumpy and uneven in its application.

The problem of maintaining a lower temperature from the standpoint of the resin body, while at the same time, providing a sufficient temperature for assuring a relatively thin, uniform and smooth coating, presented a problem which I had considerable difficulty in solving. However, I discovered that I could so control the temperature of application of the wax and the temperature of the surface of the resin body in such a manner as to meet both conditions. In other words, by spraying or atomizing a molten wax coating, I have been able to reduce the temperature of the droplets as they contact the polystyrene surface, and, at the same time, assure a smooth and uniform application.

Five jars were wax sprayed, using a reservoir of molten wax, with the temperature at the reservoir being held at about 193° F. The wax surface had a grainy appearance indicative of a non-molten state of the droplets as they contacted the polystyrene surface. These jars, when tested, show a moisture vapor loss of .043 gram per week. An additional five jars were sprayed using a wax reservoir temperature of about 250° F. and, on testing, the coated container showed a moisture vapor less of .039 gram per week. A further lot of five jars was sprayed employing a wax reservoir temperature of about 211° F. and, on testing, the coated containers showed a moisture vapor loss of .77% per year or .017 gram per week.

Although excessive heat applied to the expanded polystyrene surface by filling the jars with hot wax definitely creates pin (fine) holes in the wax surface coating, I found that by a properly controlled use of a spray application, even at a more desirable higher temperature for the wax coating, that the total heat supplied to the polystyrene surface could be maintained below critical temperatures wherein, on one hand, the coating would be too thick or rough in appearance, or, on the other hand, would cause the polystyrene beads to further expand and produce pin holes. I discovered that too low a wax temperature was not conducive to producing the best moisture vapor barrier, as indicated from the jars coated, using a wax reservoir temperature of 193° F.

I also found that thickness can be controlled to provide a thin, smooth and uniform coating which constitutes a suitable moisture barrier by a sprayed wax type of application. I have been able to provide an average coating thickness of about .002 to under .006 inch by a spray application, and to provide an optimum of .004 inch average thickness, as distinguished from .006 inch or more for a coating which is applied by filling the container with wax and dumping it.

It is desirable to use a wax which has a high melting point, if possible, so that it will not be easily damaged when the jar is later filled with contents that may be heated above room temperature to facilitate the pouring operation. This heating of contents in the nature of a grease or cream is conventional, since materials of this nature do not readily flow at room temperature. Also, waxes with higher melting points are usually harder at room temperature and are thus less inclined to be damaged, as by scraping by the fingernails of the person removing contents from the jar. The wax may include low molecular weight polyethylene (powdered) and other organic substances (of such a nature or minimum quantity as to be inert to the resin body) to decrease the crystal size of the paraffin wax and further improve the moisture barrier effect.

An open-mouth hollow container body 15 is made by steam-expanding resin pellets or beads within a mold cavity to form a composite body which may have a neck portion shaped to form an open mouth as well as fastening means, such as screw threads. The expanded body is made up of adherent expanded beads that provide it with a relatively lightweight construction that may have a density of about ½ to 20 pounds per cubic foot, with about 5 pounds per cubic foot as an optimum. If desired, the outer surface of the container may be conditioned to provide it with a glossy and smooth appearance by employing a differential cooling action.

In FIGURE 1, I have somewhat diagrammatically shown how a series of expanded polystyrene resin bead container bodies 15 may be carried in an upsidedown or inverted relation by a rotating table 25 for successively moving them to a wax-spraying station, at which hot liquid or molten coating wax is applied to their inner surfaces. In this figure, 18 is a stand for the apparatus which has a bearing 18a for journaling the lower end of an upright shaft 19 to the upper end of which the table 25 is keyed or feathered for rotation therewith. An upright leg portion 18b of the stand 18 carries a mounting 20a for an upper bearing 20 that journals the upper portion of the shaft 19.

A stop and start controlled electric motor 21 is shown operatively connected through a gear reduction unit 22 to turn the shaft 19. An atomizing nozzle or spray unit 23 is shown secured by a support bracket 26 on the stand 18 to direct molten globules or nodules of the wax upon the inner surface of the particular container body 15 at the spraying station. When this has been done, the table 25 moves a step and presents a second body 15 for spraying. The coating 17 (see FIGURE 3) on the inner surface of the first body is then permitted to cool and set while the second or successive body is being treated.

As shown in FIGURE 1, paraffin wax is melted-down into a molten condition within a reservoir 28 by a suitable burner 29 and is then conducted through pipe or conduit 30 from the reservoir, through a pump 31 and a pipe or conduit 24 to the nozzle unit 23. The pump 31, at its suction end, draws the molten wax out of the reservoir 28 and, at its pressure or delivery end supplies the wax under a positive atomizing pressure to the nozzle unit 23. An electric motor 32 is shown for driving the pump 31.

In FIGURE 2 I have shown a completed expanded polystyrene article or open-mouth container 15, as processed or produced in accordance with my invention. It will be noted that the container body has a threaded neck portion to removably-receive a conventional closure cap (such as of metal) and has an annular sealing ring that is centrally-positioned to project outwardly or upwardly from its lip edge. The inner surface or surfaces 15a of its body are shown provided with a wax coating 17 in an adherent sealing-off relation therealong; the outer surface is designated as 15b.

Thus, in accordance with my invention, I provide and utilize a wax coating material that may be atomized while in a molten condition and that is applied in such condition to the surface of the expanded resin container and is then solidified in an adherent relation thereon. The coating material is relatively inert and does not and is not permitted to react upon the resin material of the surface to which it is applied, either from the standpoint of its chemical content or from the standpoint of the heat which may be carried by it to the resin body. I have been able to provide such a coating that not only has a good adherent relation on the surface of the body, but that also provides an effective and highly efficient moisture barrier to prevent escape or diffusion of moisture from the materials that are being stored within the cavity of the container body. In doing this, I have been able to make use of the wax coating at its most efficient temperature for a coating application without causing a reaction on the surface of the resin material being coated which will tend to spoil the nature and effectiveness of the coating when solidified thereon.

The heat carried by minute globules or nodules of the wax material used as the coating is such that further expansion of the resin material is prevented, but the temperature of the wax is sufficiently high to make full use of it in its molten condition to provide an unbroken, relatively thin, uniform and smooth type of coating. The coating application, in itself, as applied in accordance with my invention, does not set up or cause holes in the coating 17. To avoid voids or fine holes that may be caused by the spray application or by further expanding the resin material of the container body, I have found that it is important to maintain the resin surface at a temperature not in excess of about 140° F. and to maintain the wax coating (during its spray application) within a maximum temperature of 180° F. and, as a minimum, at about 140° F. or at the full melting temperature of the coating material. I have discovered that a molten spray application of the wax provides a dispersed type of contact such that, up to 180° F. of temperature of application can be employed without causing the resin bead material of the surface of the body to heat up sufficiently (above about 140° F.) to cause the resin material to react or expand further and produce pin holes in the wax as it quickly solidifies.

Summarized briefly, I have found that a desirable high temperature of molten wax application could be used so as to produce a highly effective protective coating and, at the same time, without damaging the coating, as applied, or producing a poor coating from the standpoint of its appearance, thickness, or lack of smoothness and moisture barrier effectiveness. This is accomplished by using a liquidized spray, or molten atomized or fine vapor application of the wax coating material, and doing so in such a manner as to keep the temperature of the polystyrene surface below about 140° F. In this connection, I have discovered that the temperature of the wax at the spray nozzle should be kept within a critical range of about 140° (or the melting point of the wax) and 180° F., as controlled by the heating temperature applied at the reservoir 28. The thickness of the wax coating should be less than about .006 inch as an average and may effectively be as thin as about .002 inch, with about .004 inch as an optimum.

What I claim is:

1. A lightweight container of expanded polystyrene bead construction of a density within about ½ to 20 pounds per cubic foot having a paraffin wax coating of a thickness of about .002 to less than about .006 of an inch in an adhering and relatively uniform relation on a surface of its wall, said coating having a melting point within a range of about 140° to about 180° F., said coating also being in a solidified state and being characterized by its smoothness and freeness from pin holes and by providing the body with a minimum resistance to moisture vapor loss of about .043 gram per week.

2. A container as defined in claim 1 wherein the wax coating has a thickness of about .004 of an inch.

3. A container of expanded polystyrene bead construction having a paraffin wax coating sprayed on an inner surface thereof in a molten atomized condition and at a temperature within a range of about 140° to 180° F. while the body and its inner surface are maintained at a temperature below a maximum of about 140° F., said coating as applied being solidified and substantially uniform along the surface and having a thickness of about .002 to less than about .006 of an inch, said coating being further characterized by its smoothness and freeness from pin holes and by imparting a minimum resistance to vapor loss to the body of about .043 gram per week.

4. A container as defined in claim 3 wherein said wax coating has a small amount of polyethylene powder mixed therewith.

5. A method of vapor-leakage profing a relatively lightweight open-mouthed container body that is expansion-formed at an elevated temperature from polystyrene resin beads which comprises, spray-applying a molten wax upon and coating a surface of the body while maintaining the wax at the spray source at a minimum temperature corresponding to the melting point of the wax and within a maximum temperature of about 180° F. and while maintaining such surface at a temperature within a maximum of about 140° F., applying the wax coating in the defined manner to a thickness of about .002 to less than about .006 of an inch, and solidifying the wax coating substantially uniformly and smoothly along the surface of the resin body to provide the body with a minimum resistance to moisture vapor loss of about .043 gram per week.

6. A method as defined in claim 5 wherein the wax coating is pressure-sprayed from the source in the form of fine molten globules having a temperature within a range of about 140° to 180° F.

7. A method of vapor-leakage-proofing a relatively lightweight open-mouth container body of a density of about ½ to 20 pounds per cubic foot that is expansion-formed at an elevated temperature from polystyrene resin beads which comprises, spray-applying a paraffin wax coating in a molten condition at a spray temperature within a range of about 140° to 180° F. upon an inner surface of the body while simultaneously maintaining such surface at a temperature within a maximum of about 140° F. thereby inhibiting reaction of and expansion of the resin beads of the body, applying the wax coating in the defined manner to a thickness of about .002 to less than about .006 of an inch, and solidifying the wax coating substantially uniformly and smoothly along the inner surface of the resin body to provide the body with a minimum resistance to moisture vapor loss of about .043 gram per week.

8. A method as defined in claim 7 wherein the wax coating is applied to an average thickness of about .004 of an inch.

9. A method as defined in claim 7 wherein a small amount of a polyethylene powder is mixed with the wax of the coating before the wax coating is applied to the inner surface of the body.

10. A method of vapor-leakage proofing a relatively lightweight open-mouth container having a body of a density of about 5 pounds per cubic foot that is somewhat microscopically porous and that is expansion-formed at an elevated temperature from polystyrene resin beads which comprises, spray-applying a wax coating under a positive atomizing pressure and in a molten spray condition of a temperature within a range of about 140° to 180° F. on an inner surface of the body while maintaining such surface at a temperature within a maximum of about 140° F. to inhibit forming pin holes in the coating as applied, effecting the application of the wax coating substantially uniformly along the inside surface of the body without expanding the resin beads of the body, and solidifying the wax as a substantially smooth and uniform coating therealong having an average thickness of about .002 to less than .006 inch.

References Cited by the Examiner

UNITED STATES PATENTS

| | | | |
|---|---|---|---|
| 1,655,290 | 1/28 | Phelps et al. | 118—319 XR |
| 2,512,581 | 6/50 | Palermo | 118—319 XR |
| 2,512,651 | 6/50 | Jacobs | 118—317 XR |
| 2,547,989 | 4/51 | Wiley | 18—47.5 |
| 2,624,501 | 1/53 | Ferris. | |
| 2,700,625 | 1/55 | Morris et al. | 18—48 XR |
| 2,721,821 | 10/55 | Hoover | 117—138.8 |
| 2,777,781 | 1/57 | Kordig | 117—168 X |
| 2,817,600 | 12/57 | Yahnke | 117—168 X |

(Other references on following page)

UNITED STATES PATENTS

| | | | |
|---|---|---|---|
| 2,887,262 | 5/59 | Rogers | 229—3.1 |
| 2,942,301 | 6/60 | Price. | |
| 2,951,260 | 9/60 | Harrison et al. | |
| 2,958,905 | 11/60 | Newberg | 18—48 |

FOREIGN PATENTS

| | | |
|---|---|---|
| 417,102 | 9/34 | Great Britain. |
| 537,610 | 6/41 | Great Britain. |

OTHER REFERENCES

Teach et al.: "Polystyrene," Reinhold Plastics Applications Series, Reinhold Publishing Corporation, 1950, pp. 145, TP 986 S7T4 C.3.

WILLIAM D. MARTIN, *Primary Examiner.*

MURRAY KATZ, WILLIAM STEPHENSON, F. T. GARRETT, *Examiners.*

UNITED STATES PATENT OFFICE
CERTIFICATE OF CORRECTION

Patent No. 3,189,242

June 15, 1965

John B. Orr

It is hereby certified that error appears in the above numbered patent requiring correction and that the said Letters Patent should read as corrected below.

Column 3, line 31, for "less" read -- loss --; line 51, for "coatting" read -- coating --; column 6, line 1, for "profing" read -- proofing --.

Signed and sealed this 21st day of December 1965.

(SEAL)
Attest:

ERNEST W. SWIDER
Attesting Officer

EDWARD J. BRENNER
Commissioner of Patents